3,118,939
QUATERNARY AMMONIUM HEXABORATES
Manuel Finkelstein, Sidney D. Ross, and Raymond C. Petersen, Williamstown, Mass., assignors to Sprague Electric Company, North Adams, Mass., a corporation of Massachusetts
No Drawing. Filed June 29, 1960, Ser. No. 39,450
1 Claim. (Cl. 260—567.6)

This invention relates to quaternary ammonium hexaborate compounds.

Quaternary ammonium hexaborates have shown particularly unique properties in use as solutes of electrolytes in electrolytic capacitors. They have desirable solubility characteristics in a variety of solvents. It has also been found that the quaternary ammonium hexaborates provide solutes having a range of solubility characteristics as a consequence of the effect of the specific quaternary ammonium ion of the borate salt. Thus, it is desirable to provide quaternary ammonium hexaborates as they afford a wide variety of solutions with a high concentration of borate ions.

It is an object of this invention to provide quaternary ammonium hexaborate compounds which provide quaternary ammonium cations and a high concentration of borate anions in solution in a wide variety of solvents.

This and other objects of this invention appearing hereinafter are accomplished by the compounds of the herein described invention, in which the electrolyte solutes are quaternary ammonium hexaborates, which are solutes whose anion is the hexaborate anion and whose cation is the quaternary ammonium ion. These salts have the formula $QH_4B_5O_{10} \cdot H_3BO_3$ wherein Q represents the quaternary ammonium radical.

The quaternary ammonium ion may be represented by the following structural formula:

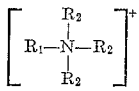

wherein $R_1$ is from the group consisting of cinnamyl and benzyl, and $R_2$ is from the group consisting of allyl and alkyl through $C_3$.

These salts may be made soluble in water or in a variety of organic solvents by suitable choices of the substituent radicals in the quaternary ammonium cation.

Materials suitable for the preparation of the quaternary ammonium hexaborate salts are readily available. These materials may be converted into satisfactory ammonium hexaborates of the above formula by several methods. One method involving the use of a tertiary amine is carried out in a solvent by a reaction between the amine and an organic halide, after which the ionic halogen product is replaced by hydroxide ion by treatment with silver oxide. The resulting silver halide is filtered off and the filtrate is treated with boric acid. The quaternary ammonium hexaborate is then recovered from the solvent.

The following examples in which parts and percentages are by weight unless otherwise stated, illustrate the more detailed practice of the invention but are not to be construed as limitative. The salts prepared in these examples were analyzed for nitrogen by the Kjeldahl method and for carbon and hydrogen by standard combustion techniques. The acid neutral equivalent (A.N.E.) of the salt was determined by titration with standard HCl to brom cresol green end point. The base neutral equivalent (B.N.E.) was determined by titration with standard NaOH to a phenolphthalein end point in the presence of mannitol.

*Example I*

20 grams of cinnamyl bromide in 100 ml. of acetonitrile had added to it 25 ml. of triethylamine. Heat was evolved by the consequent reaction and after two hours' standing the solution was concentrated under vacuum to yield a product. Acetone and ether were added to the product material with stirring after which the mixture was filtered to give a white powder. The white powder was crystallized and dissolved in water and treated with silver oxide. The solution was filtered and diluted to 500 ml. and analyzed for base and found to contain 0.085 equivalent. 26 grams of boric acid were added and the mixture was heated to solution, filtered, and concentrated under vacuum. The residue was concentrated, twice recrystallized, and dried under vacuum at 70° C.

*Analysis.*—Found: C, 35.97; H, 5.95; N, 2.82; B, 13.55; A.N.E., 494.5; B.N.E., 100.8. Calculated for

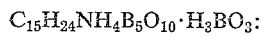

C, 36.15; H, 6.27; N, 2.81; B, 13.03; A.N.E., 498.3; B.N.E., 99.7.

*Example II*

A solution of 15.1 grams of benzyldimethylallylammonium iodide was treated with silver oxide and the filtrate was mixed with 15.5 grams of boric acid, the mixture was heated to solution, and the solution was concentrated to dryness. The white solid was twice recrystallized from water-isopropyl alcohol, filtered, washed with ether, and the crystals were dried in vacuum at 70° C.

*Analysis.*—Found: C, 31.81; H, 5.65; N, 2.95; B, 14.08; A.N.E., 454.2; B.N.E., 92.1. Calculated for

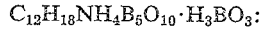

C, 31.59; H, 5.52; N, 3.07; B,14.23; A.N.E., 456.3; B.N.E., 91.3.

*Example III*

A solution of 78 grams of benzyldimethyl-n-propylammonium bromide was treated with silver oxide, filtered through Celite, diluted to 500 ml. and divided into three portions of 0.1005 base equivalent. These three portions were treated with (a) 24.7 grams; (b) 30.9 grams; and (c) 37.1 grams of boric acid. Each of the three portions was heated to solution and concentrated by boiling. The crystalline products from each portion were twice recrystallized from water and dried under vacuum at 90° C.

*Analysis.*—Found: (a) A.N.E., 453.8; B.N.E., 94.9. (b) A.N.E., 457.3; B.N.E., 94.2. (c) C, 31.22; H, 5.43; N, 3.06; B, 13.97; A.N.E., 458.4; B.N.E., 92.9. Calculated for $C_{12}H_{20}NH_4B_5O_{10} \cdot H_3BO_3$: C, 31.45; H, 5.94; N, 3.06; B, 14.17; A.N.E., 458.3; B.N.E., 91.7.

These salts herein described are hexaborates. The analyses establishes that they contain six boron atoms for each quaternary ammonium ion. In general, the hexaborate part of the salt molecule has the formula

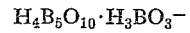

The salt crystallizes as $QH_4B_5O_{10} \cdot H_3BO_3$ as determined by the nature of the cation.

The various quaternary ammonium ions have been shown to have a variety of uses and applications, including antiseptics and other medical uses. In addition, quaternary ammonium salts have been found to have high surface activity and are useful as agents employing this characteristic.

By proper selection of the four organic radicals of the quaternary ammonium ion, a high degree of solubility will be achieved in a wide variety of solvents. The quaternary ammonium hexaborates are useful also as solutes in electrolytes for electrolytic capacitors.

Reference is made to the copending application Serial No. 7,112, filed February 8, 1960, for Quaternary Ammonium Pentaborates.

As many apparently widely different embodiments of this invention may be made without departing from the spirit and the scope hereof, it is to be understood that this invention is not limited to the specific embodiments hereof except as defined in the appended claim.

What is claimed is:

A compound of the empirical formula $$QH_4B_5O_{10} \cdot H_3BO_3$$

wherein Q is selected from the group consisting of cinnamyltriethylammonium, benzyldimethylallylammonium, and benzyldimethyl-n-propylammonium radicals.

References Cited in the file of this patent

UNITED STATES PATENTS 2,873,282    McClellan _____ Feb. 10, 1959

OTHER REFERENCES

Ferrari et al.: Gazz. Chem. Ital., vol 69, pages 284–290 (1939).

Peterson et al.: J.A.C.S., vol. 81, pages 3264–3267 (1959).